United States Patent [19]

Rüge et al.

[11] Patent Number: 4,879,475

[45] Date of Patent: Nov. 7, 1989

[54] DEVICE AND METHOD FOR MAINTAINING A VOLTAGE LEVEL IN A CONTROL CIRCUIT

[75] Inventors: Joachim Rüge, Monchengladbach; Gregor Kathke; Helmut Schlösser, both of Viersen, all of Fed. Rep. of Germany

[73] Assignee: W. Schlafhorst & Co., Fed. Rep. of Germany

[21] Appl. No.: 290,854

[22] Filed: Dec. 28, 1988

Related U.S. Application Data

[63] Continuation of Ser. No. 103,898, Oct. 2, 1987, abandoned.

[30] Foreign Application Priority Data

Oct. 3, 1986 [DE] Fed. Rep. of Germany ....... 3633627

[51] Int. Cl.[4] .............................................. H02J 9/00
[52] U.S. Cl. ....................................... 307/68; 318/34
[58] Field of Search ................ 318/34, 140, 150, 161; 307/64, 65, 66, 67, 68

[56] References Cited

U.S. PATENT DOCUMENTS

| | | | |
|---|---|---|---|
| 4,096,394 | 6/1978 | Ullmann et al. | 307/66 X |
| 4,339,779 | 7/1982 | Kalbach | 307/68 X |
| 4,406,950 | 9/1983 | Roesel, Jr. | 307/68 X |
| 4,471,233 | 9/1984 | Roberts | 307/66 |
| 4,592,197 | 6/1986 | Wolf | 242/26.1 |
| 4,707,774 | 11/1987 | Kajita | 307/66 X |

FOREIGN PATENT DOCUMENTS

58-36172 5/1983 Japan.
0684673 9/1979 U.S.S.R. ................... 307/68

Primary Examiner—Bentsu Ro
Attorney, Agent, or Firm—Shefte, Pinckney & Sawyer

[57] ABSTRACT

A device and method for temporarily maintaining a voltage level in a control circuit for auxiliary devices in a textile spinning machine, winding machine or the like wherein the control circuit is connected to an intermediate direct current circuit that is in series between a line voltage and the drive motors of the machine. The method includes reversibly supplying current from the intermediate circuit to the motors and inversely supplying current generated by the residual inertial energy of the motors to the intermediate circuit. The supplying of reversible current is controlled in response to a drop in line voltage to maintain the voltage level of the intermediate circuit and therefore of the control circuit supplying auxiliary devices. The controlling includes sensing a drop in line voltage and generating and transmitting control signals to reversibly supply current. The device functions to perform the method by providing a two-way converter for supplying current to the motors under normal operation and reversibly supplying current generated by the residual inertial energy of the motors in response to a drop in line voltage, a sensing device senses a drop in line voltage, and another component generates control signals for transmitting to the two-way converter for reversing thereof.

3 Claims, 1 Drawing Sheet

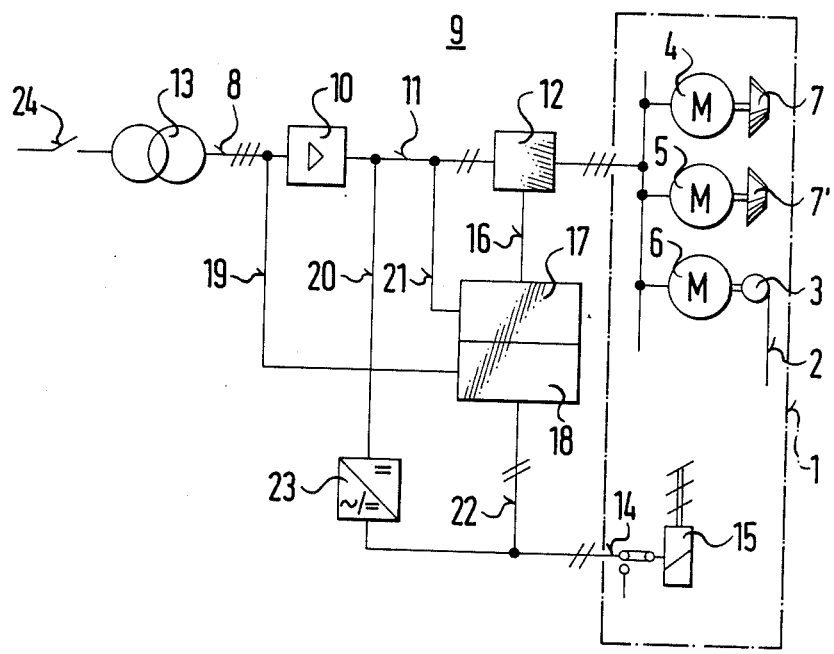

DEVICE AND METHOD FOR MAINTAINING A VOLTAGE LEVEL IN A CONTROL CIRCUIT

This application is a continuation of co-pending application Ser. No. 103,898, filed Oct. 2, 1987, now abandoned.

BACKGROUND OF THE INVENTION

The present invention relates to the electrical operating circuitry of a textile spinning machine, winding machine or the like, and more particularly to the temporary maintenance of the voltage level in a control circuit for auxiliary devices and the drive motors of such textile machines.

Conventional textile spinning machines, winding machines or the like have drive motors supplied with electrical energy from a three-phase power source and have a control voltage circuit for supplying electrical energy to auxiliary devices. A disadvantage of this arrangement is that if an outage of the three-phase power source occurs, even for a very short period of time, the contactors and power relays in the control circuits of the drive motors and auxiliary devices will deenergize causing disruption of the operation and control with eventual stoppage of the machine, resulting in lost production and requiring resetting and restarting of the machine. Outage of the three-phase power source often occurs momentarily for no longer than a few seconds or less, and may frequently be caused by switching of remote main feeders by the power supplier or by lightning. It is therefore highly desirable to prevent the voltage in the control circuit from dropping during momentary electrical outages. Conventionally, the voltage level of the control circuit may be maintained during electrical outages by the inclusion of batteries or generators, but these devices are not without their disadvantages and both have high initial costs and require regular maintenance and monitoring.

The objective of the present invention is to provide a more reliable spinner arrangement for maintaining the voltage level in the electrical control circuits of a textile spinning machine, winding machine, or the like in response to momentary drops in voltage of the three-phase power source

SUMMARY OF THE INVENTION

The present invention provides a device and method for temporarily maintaining a voltage level in a control circuit for auxiliary devices in a textile spinning machine, winding machine or the like wherein the control circuit is connected to an intermediate direct current circuit that is in series between a line voltage and drive motor means of the machine.

Briefly described, the method of the present invention comprises the steps of reversibly supplying current from the intermediate circuit to the motor means and supplying current generated by the residual inertial energy of the motor means to the intermediate circuit and controlling the reversible current supplying in response to a drop in line voltage to supply current generated by the residual inertial energy to the intermediate circuit to maintain the voltage level therein and also in the control circuit coupled thereto for supplying the auxiliary devices. The step of controlling further includes sensing a drop in line voltage below a predetermined value and generating and transmitting control signals for reversible current supplying in response to the sensing and for maintaining the voltage level. The method also includes the step of coupling the intermediate circuit and the control circuit. The coupling of the two circuits includes conditioning the electrical signals from the intermediate circuit for utilization by the auxiliary devices.

The foregoing method can be practiced using the device of the present invention which includes means for supplying current from the intermediate circuit to the drive motor means and reversible for supplying current generated by the residual inertial energy of the drive motor means during momentary outage of the line voltage to the intermediate circuit. Control means are provided responsive to a drop in line voltage to reverse the reversible means to maintain the voltage level of the intermediate circuit and in so doing also maintain the voltage level of the control circuit for the auxiliary devices connected to the intermediate circuit. Preferably, the reversible supplying means is a two-way converter.

The control means comprises a means for sensing a drop in line voltage, preferably a voltage monitoring device, below a predetermined value and means for generating control signals, preferably an energy feedback control device. The control signals generated are then transmitted by a transmitting means from the control signal generating means to the two-way converter for reversing the converter to supply the residual inertial energy of the supply motors to the intermediate circuit for maintaining the voltage thereof and consequently maintaining the voltage in the control circuit supplied from the intermediate circuit in response to sensing by the voltage monitoring device.

In the preferred embodiment the transmitting means is simply an electrical connection from the energy feedback control device to the control input of the two-way converter. The energy feedback control device in conjunction with the two-way converter serves to regulate the voltage in the intermediate circuit to maintain the voltage level constant.

The sensing means may also indirectly sense a drop in line voltage by sensing the resulting drop in voltage in the intermediate circuit; however, it is preferred that the sensing means sense a drop in voltage level of the line voltage so that the energy feedback control device cna be activated by the voltage monitoring device after a drop in line voltage below the predetermined value, and the two-way converter can be reversed to feed back energy to the intermediate circuit before the voltage level has dropped therein to an appreciable extent.

In the preferred embodiment, the control circuit is coupled to the intermediate circuit by a coupling means which is adapted for conditioning electrical signals from the intermediate circuit for utilization by the auxiliary devices served by the control unit. In one embodiment of the present invention, the control circuit is supplied from another source rather than the intermediate circuit and is only coupled by the coupling means to the intermediate circuit in response to a drop in line voltage. In which case, the intermediate circuit only supplies the control circuit under emergency situations. This feature has the advantage that under normal operating conditions reactions in the control circuit will not affect the intermediate circuit. Since the intermediate circuit and the control circuit can have different voltage requirements, it is preferable that the coupling device provide for galvanic separation. The coupling means is preferably an inverter, converter, or the like for conditioning the electrical energy for use by the auxiliary devices.

In the preferred embodiment, a rectifier is connected in series between the line voltage and the intermediate circuit for conditioning the line voltage for use by the two-way converter and the control circuit.

The device of the present invention will maintain the voltage level of the intermediate circuit essentially constant, as described above, for several seconds. By that time, if the outage is due to a lightning strike or momentary switching by the utility, the line voltage should again be present with the machine experiencing only a brief, slight reduction in speed which should not significantly impact sliver processing as previously described. However, if the line voltage outage should last longer than a few seconds, allowing the residual inertial motion of the drive motors to dissipate substantially, the electrical energy generated by the inertial motion will eventually no longer support the intermediate circuit and the control circuit coupled thereto and the contactors and relays associated with the drive motors and auxiliary devices will deenergize, stopping operation and requiring resetting and restarting when the line voltage comes back on-line and the two-way converter automatically reverses back to normal drive operation.

Other and further features and advantages of the present invention will be apparent from the accompanying drawings and the following detailed description of the preferred embodiments.

DESCRIPTION OF THE DRAWINGS

The FIGURE is a schematic view of a device for maintaining a voltage level in a control circuit incorporating the preferred embodiment of the present invention.

DETAILED DESCRIPTION OF THE PREFERRED EMBODIMENT

Referring now to the accompanying drawing, the present invention is utilized with an open end spinning machine 1 that spins yarn 2 in rotors 7,7' and winds the yarn 2 onto winding cores 3. The machine has drive motors 4,5,6 which drive the rotors 7,7' and the winding core 3. Other details of the spinning machine are conventional and are not shown for the sake of simplicity as they are not necessary for the understanding of the invention.

The drive motors 4,5,6 are supplied from a three-phase line voltage feeder with the device 9 including a rectifier 10, direct current intermediate circuit 11 and two-way converter 12 in series therebetween. The line voltage feeder is served by a transformer 13. A power outage or drop in the line voltage level is represented by the open switch symbol 24. The machine 1 also includes a control circuit 14 for supplying auxiliary devices 15.

The two-way converter 12 has a control input which is electrically connected to a control means by a control lead 16. The control means is in the form of an energy feedback control device 17 and a voltage monitoring device 18. The voltage monitoring device 18 is connected to the line voltage feeder 8 by lead 19 for sensing a drop in voltage therein below a predetermined value.

The control circuit 14 is connected to and supplied from the intermediate circuit 11 by lead 20 with a coupling device 23 in series therebetween. Preferably, the coupling device 23 is a converter for conditioning the voltage from the intermediate circuit 11 for utilization by the auxiliary devices 15. The coupling device 23 also provides for galvanic separation of the differing voltages in the intermediate circuit 11 and the control circuit 14. The energy feedback control device 17 and voltage monitoring device 18 are independently supplied with power from the control circuit 14 through lead 22.

Under normal operating conditions, the two-way converter 12 supplies current from the intermediate circuit 11 to the drive motors 4,5,6, and control circuit 14 is supplied current from the intermediate circuit 11 conditioned by the coupling device 23. When the voltage monitoring device 18 senses a drop in the line voltage of the feeder 8, or an outage as represented by the open switch symbol 24 in the drawing, the monitoring device 18 activates the energy feedback control device 17 which generates control signals. The control signals are transmitted by the control lead 16 to the control input of the two-way converter 12 for reversing the two-way converter 12. In this reversed operational state, the two-way converter 12 supplies current generated by the residual inertial energy of the motors 4,5,6 to the intermediate circuit 11 to maintain the voltage level thereof. The drive motors 4,5,6 will continue to run momentarily after a power outage or line voltage drop due to their massive inertia until eventually stopping due to frictional forces. Until stoppage, the drive motors 4,5,6 will function as current generators.

The energy feedback control device 17 is electrically connected to the intermediate circuit 11 by a lead 21 for monitoring the voltage level in the intermediate circuit 11. In this manner, the energy feedback control device 17 in conjunction with the two-way converter 12 regulates the voltage returned to the intermediate circuit 11 to maintain its level and consequentially the voltage level in the control circuit 14 essentially constant. This mode of operation is possible for several seconds. By that time, if the outage was momentary, the line voltage should again be present. The voltage monitoring device 18 will sense the return of line voltage and deactivate the energy feedback control device 17, and the two-way converter 12 will be reversed back to supply current from the intermediate circuit 11 to the drive motors, 4,5,6 with the machine 1 experiencing only a brief, slight reduction in speed which should not significantly impact production. If the outage persists longer than a few seconds and the drive motors 4,5,6 slow substantially, the residual inertial motion of the drive motors 4,5,6 will not be able to generate sufficient current to be fed back to the intermediate circuit 11 and the control circuit 14 coupled thereto to sustain the contactors and relays (not shown) associated with the drive motors 4,5,6 and the auxiliary devices 15. The contactors and relays will then deenergize, stopping operation and requiring resetting and restarting when the line voltage comes back on-line and the two-way converter 12 reverses back to normal drive operation.

If the voltage outage does persist, the device 9 can be separated from the line voltage or taken out of operation by a switch 24 or other switching means (not shown).

In another embodiment of the present invention, not illustrated in the drawing, the control circuit 14 can be supplied under normal operating conditions from another source of power such as the three-phase line voltage feeder 8 and will be connected to the intermediate circuit 11 by a lead 20 and the coupling device 23 only during a power outage or a drop in line voltage situation.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A device for temporarily maintaining a voltage level in a control circuit for auxiliary devices of a textile machine, the textile machine having a motor means which receives current supplied by a line voltage, comprising:

an intermediate direct current circuit connected to the control circuit via a coupling device; a converter;

a converter control means; a line voltage sensing means connected to the line voltage;

wherein said intermediate direct current circuit and said converter are connected in series between the line voltage and the motor means;

said converter is controllable by said converter control means to supply current from the line voltage to the motor means and to reversibly supply current generated by the residual inertial energy of the motor to the control circuit; and said converter control means being connected to the line voltage sensing means and being responsive to the line voltage sensing means to control the converter in accordance with the requirement that the converter is reversed to supply current generated by the motor means to the control circuit when the line voltage sensing means senses a drop voltage level in the line voltage.

2. A device according to claim 1, wherein said converter is a two-way converter and said device further includes a rectifier connected between the line voltage and the intermediate direct current circuit.

3. A device according to claim 2, wherein said converter control means includes an energy feedback control device connected to said line voltage sensing means and said two-way converter.

* * * * *